(12) United States Patent
Predmore, II et al.

(10) Patent No.: US 9,679,609 B2
(45) Date of Patent: Jun. 13, 2017

(54) SYSTEMS AND METHODS FOR CATALOGUING AUDIO-VISUAL DATA

(71) Applicant: UTC Fire & Security Corporation, Farmington, CT (US)

(72) Inventors: Thomas J. Predmore, II, Albany, OR (US); Srivallabha Kommareddy, Hyderabad (IN)

(73) Assignee: UTC Fire & Security Corporation, Farmington, CT (US)

( * ) Notice: Subject to any disclaimer, the term of this patent is extended or adjusted under 35 U.S.C. 154(b) by 0 days.

(21) Appl. No.: 14/824,872

(22) Filed: Aug. 12, 2015

(65) Prior Publication Data

US 2016/0049175 A1  Feb. 18, 2016

Related U.S. Application Data

(60) Provisional application No. 62/037,332, filed on Aug. 14, 2014.

(51) Int. Cl.
| | | |
|---|---|---|
| *H04N 9/80* | (2006.01) | |
| *G11B 27/32* | (2006.01) | |
| *G06F 17/30* | (2006.01) | |

(52) U.S. Cl.
CPC ............ *G11B 27/323* (2013.01); *G06F 17/30* (2013.01)

(58) Field of Classification Search
CPC .............................. G11B 27/026; G11B 27/34
USPC ........ 386/241, 243, 248, 278, 281, 285, 290
See application file for complete search history.

(56) References Cited

U.S. PATENT DOCUMENTS

| | | | |
|---|---|---|---|
| 7,266,777 B2 | 9/2007 | Scott et al. | |
| 7,685,154 B2 | 3/2010 | Harboe et al. | |
| 8,316,320 B2 | 11/2012 | Relyea et al. | |
| 8,380,041 B2 | 2/2013 | Barton et al. | |
| 8,494,340 B2 | 7/2013 | Wang et al. | |
| 8,640,183 B2 | 1/2014 | Reisman | |
| 8,650,593 B2 | 2/2014 | Choi et al. | |
| 2002/0069218 A1* | 6/2002 | Sull ................... | G06F 17/30796 715/202 |
| 2005/0203927 A1 | 9/2005 | Sull et al. | |
| 2006/0041927 A1 | 2/2006 | Stark et al. | |
| 2008/0063381 A1 | 3/2008 | Conroy et al. | |
| 2011/0010624 A1 | 1/2011 | Vanslette et al. | |
| 2011/0289460 A1 | 11/2011 | Dow et al. | |
| 2012/0113265 A1 | 5/2012 | Galvin | |
| 2013/0080565 A1 | 3/2013 | van Coppenolle et al. | |
| 2013/0124997 A1 | 5/2013 | Speir et al. | |
| 2013/0246530 A1 | 9/2013 | Lentzitzky | |
| 2013/0305273 A1 | 11/2013 | Hadfield et al. | |
| 2013/0347036 A1 | 12/2013 | Athias | |

* cited by examiner

*Primary Examiner* — Robert Chevalier
(74) *Attorney, Agent, or Firm* — Locke Lord LLP; Scott D. Wofsy; Joshua L. Jones

(57) ABSTRACT

A method for cataloguing audio-visual data including indexing a plurality of audio-visual segments by specifying a storage location and recording time of each segment. A segment hierarchy is created based on the locations and times of each recording. The plurality of audio-visual segments can be recorded with a mobile digital video recorder onto a removable medium located within a vehicle such that the mobile digital video recorder can identify the vehicle in which the removable medium is located in while recording each segment.

20 Claims, 2 Drawing Sheets

SYSTEMS AND METHODS FOR CATALOGUING AUDIO-VISUAL DATA

BACKGROUND OF THE INVENTION

1. Field of the Invention

The present disclosure relates to audio-visual recordings, and more particularly to audio-visual recordings for mobile platforms such as mass transit vehicles.

2. Description of Related Art

Video and data surveillance systems are commonly used by individuals, businesses, and governments to remotely monitor activity. Traditional video, audio and data collection systems are limited because they comprise local systems that store surveillance information locally and they operate with static software. The local system is referred to as a stand-alone digital video recorder (DVR). A typical standalone system with multiple standalone video recorders contains no shared component between the many DVR's. This makes aggregating and sharing video, audio and data information very difficult and time consuming for users. In addition, such a video, audio and data collection system requires a labor intensive process of viewing data one location at a time, i.e., one DVR at a time.

Mobile DVRs (MDVRs) used as surveillance systems on moving vehicles, such as buses, have further limitations as locally saved videos must frequently be transferred to a central location. The recording media used with MDVRs are typically removable and may be moved from one vehicle's MDVR to another. Traditional solutions include the MDVR identification as part of data collection. Determining which video file was recorded on which vehicle requires extracting the MDVR identification from the collected data. As a result, it can be time-consuming to ascertain which video file was recorded on which vehicle.

Such conventional methods and systems have generally been considered satisfactory for their intended purpose. However, there is still a need in the art for improved data storage systems and methods. The present disclosure provides a solution for this need.

SUMMARY OF THE INVENTION

A method for cataloguing audio-visual data includes indexing a plurality of audio-visual segments by specifying a storage location and recording time of each segment. A segment hierarchy is created based on the locations and times of each recording. The plurality of audio-visual segments can be recorded with a mobile digital video recorder onto a removable medium located within a vehicle such that the mobile digital video recorder can identify the vehicle in which the removable medium is located while recording each segment.

The method can include uploading or storing the segment hierarchy onto a central database by either placing the removable medium into a desired docking station prior or by accessing the segment hierarchy from a remote location operatively connected to the central database, for example over a wireless network or other suitable type of wired and/or wireless network.

The method can further include searching the segment hierarchy based on location and time of each recording. The location of each recording can be based on identification of the vehicle in which the removable medium was located while recording each segment. The segment hierarchy can be sorted based any one of the location, time, and vehicle. It is also contemplated that the segment hierarchy can be displayed as a tree view of the recordings being indexed.

A system includes a processor operatively connected to a memory. The memory includes instructions recorded thereon that, when read by the processor, cause the processor to perform functions as described above with respect to the methods.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
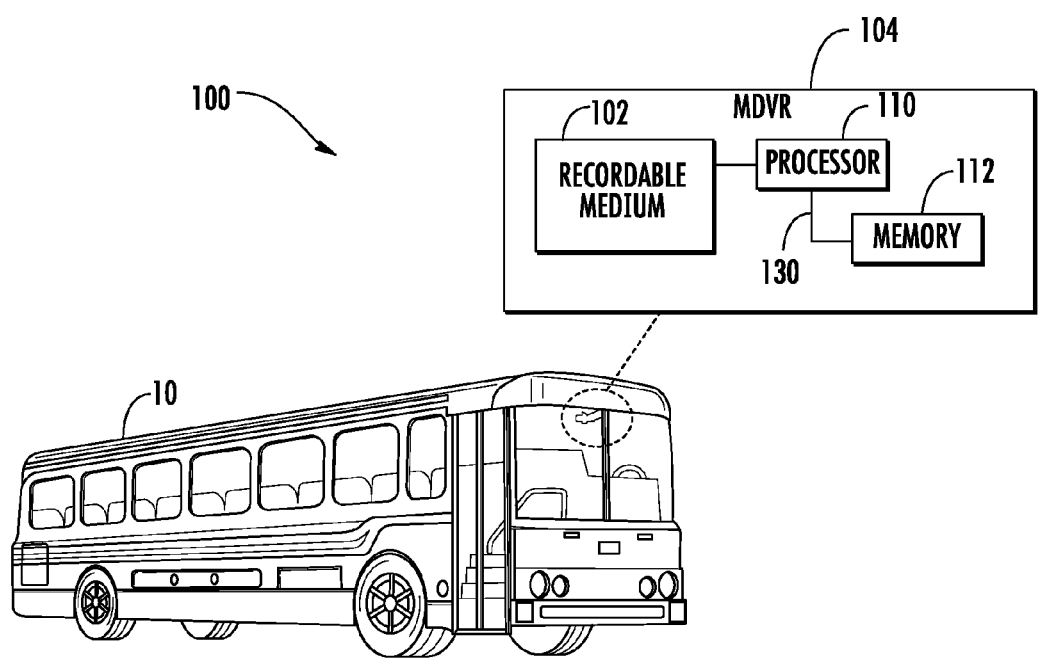
FIG. 1 is a schematic perspective view of an exemplary embodiment of an audio-visual cataloguing system constructed in accordance with the present disclosure, showing a mobile digital video recorder located on a bus connected to a removable medium.

Reference will now be made to the drawings wherein like reference numerals identify similar structural features or aspects of the subject disclosure. For purposes of explanation and illustration, and not limitation, a partial view of an exemplary embodiment of a system and method for cataloguing audio-visual data in accordance with the disclosure is shown in FIG. 1 and is designated generally by reference character 100. Other embodiments of systems and methods in accordance with the disclosure, or aspects thereof, are provided in FIG. 2, as will be described.

Vehicle 10 in FIG. 1 includes system 100, which during normal operation records audio-visual segments using an onboard mobile digital video recorder (MDVR) 104. The MDVR can include a single camera or multiple cameras placed throughout the vehicle 10. The MDVR includes a recordable medium 102. The recordable medium 102 can be any suitable electronic medium for storing audio-visual files such as a recordable disc solid state memory, or the like. The recordable medium 102 is removable from the MDVR 104. The removed recordable medium 102 may be reinserted into the MDVR 104, or moved to a different vehicle 10, or replaced by a different recordable medium 102. During operation of the vehicle 10, the MDVR 104 and recordable medium 102 work in conjunction to act as a surveillance system for the vehicle 10. The vehicle 10, as shown by way of a non-limiting example, is a public bus but can be any other suitable type of transportation vehicle.

With continued reference to FIG. 1, MDVR 104 includes a processor 110 operatively connected to a memory 112. Memory 112 includes instructions recorded thereon that, when read by processor 110, cause processor 110 to perform the functions described herein with respect to methods of cataloguing audio-visual data.

Figure 2:
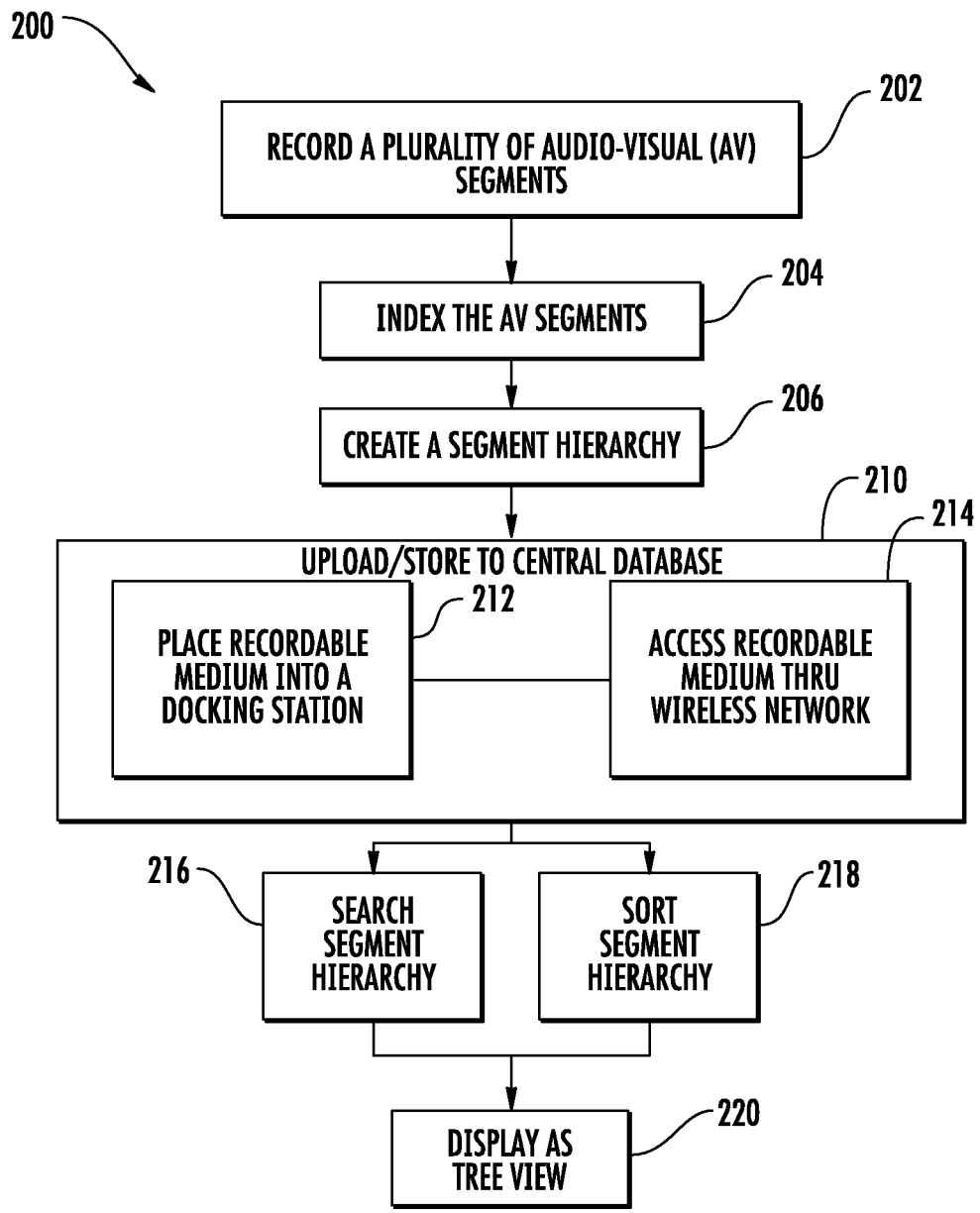
FIG. 2 is a schematic view of a method in accordance with the present disclosure, showing steps for cataloguing audio-visual data.

With reference to FIG. 2, an exemplary method 200 of cataloguing audio-visual data is shown. A MDVR, e.g., MDVR 104, records a series of audio-visual segments, as indicated at box 202, onto a recordable medium, e.g., recordable medium 102. The MDVR next indexes each of the audio-visual segments by location and by the recording time of each segment, as shown in box 204. More specifically, the MDVR indexes each time segment by the vehicle the recordable medium is located on and the day and time of each recording. If multiple cameras are present, the MDVR also indexes each segment by the particular camera on which the segment was recorded. The MDVR then creates a segment hierarchy, as shown in box 206, based on the locations and times of each recording. The segment hierarchy can be created during recording or the segment hierarchy can be created after all series of audio-visual segments are saved.

Once the segment hierarchy is created, the segment hierarchy is stored to a central database in different ways as indicated in box 210. For example as shown in box 212 the recordable medium can be transferred to a docking station located at a central station. Additionally as shown in box 214, the recordable medium is accessible thru a wireless network, or any other suitable type of network, and the segment hierarchy is uploaded to the central database. The segment hierarchy created on the recordable medium can be uploaded to central database in either manner on a regular basis. Since the segment hierarchy is created and stored on the recordable medium, the segment hierarchy is accessible at any later date.

With continued reference to FIG. 2, the audio-visual segments are accessed either by searching or sorting the segment hierarchy by location, i.e., the vehicle, or by date and time of the recording, as shown in boxes 216 and 218, respectively. The segment hierarchy is displayable as a tree view to easily search for the desired audio-visual recording, as indicated in box 220. In this manner, video files for a specific incident can be searched on the surveillance system including the MDVR and the recordable medium.

As will be appreciated by one skilled in the art, aspects of the present embodiments may be embodied as a system, method or computer program product. Accordingly, the systems and methods described herein can be implemented as a new system and/or be retrofitted to an existing system. Aspects of the present embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or wireless network, or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 includes a schematic block diagram of an example of a MDVR 104 that may be used (or components thereof) with one or more embodiments described herein, e.g., as a system for cataloguing audio-visual data. In different embodiments MDVR 104 is configured to communicate with other devices in any suitable way, such as, for example, via a communication network.

MDVR 104 is intended to represent any type of computer system capable of carrying out the teachings of various embodiments of the present disclosure. MDVR 104 is only one example of a suitable system and is not intended to suggest any limitation as to the scope of use or functionality of embodiments described herein. Regardless, MDVR 104 is capable of being implemented and/or performing any of the functionality set forth herein.

MDVR 104 is operational with numerous other general purpose or special purpose computing system environments or configurations. Examples of well-known computing systems, environments, and/or configurations that may be suitable for use with MDVR 104 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

MDVR 104 may be described in the general context of computer system-executable instructions, such as program modules, being executed by a computer system. Generally, program modules may include routines, programs, objects, components, logic, data structures, and so on that perform particular tasks or implement particular abstract data types. MDVR 104 may be practiced in distributed data processing environments where tasks are performed by remote processing devices that are linked through a communications network. In a distributed data processing environment, program modules may be located in both local and remote computer system storage media including memory storage devices.

MDVR 104 is shown in FIG. 1 in the form of a general-purpose computing device. The components of MDVR 104 may include, but are not limited to, a recordable medium 102, one or more processors 110 or processing units, a system memory 112, and a bus 130 that couples various system components including system memory 112 to processor 110.

Bus 130 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

MDVR 104 typically includes a variety of computer system readable media. Such media may be any available media that is accessible by MDVR 104, and it includes both volatile and non-volatile media, removable and non-removable media.

System memory 112 can include computer system readable media in the form of volatile memory, such as random access memory (RAM) and/or cache memory. MDVR 104 may further include other removable/non-removable, volatile/non-volatile computer system storage media. By way of example only, a storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 130 by one or more data media interfaces. As will depicted and described herein, memory 112 may include at least one program product having a set (e.g., at least one) of program modules that are configured to carry out the functions of embodiments disclosed herein.

A program/utility, having a set (at least one) of program modules, such as described above, may be stored in memory 112 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments described herein.

MDVR 104 may also communicate with one or more external devices such as a keyboard, a pointing device, a display, and the like; one or more devices that enable a user to interact with MDVR 104; and/or any devices (e.g., network card, modem, etc.) that enable MDVR 104 to communicate with one or more other computing devices. Such communication can occur via Input/Output (I/O) interfaces. Still yet, MDVR 104 can communicate with one or more networks such as a local area network (LAN), a general wide area network (WAN), a wireless network, and/or a public network (e.g., the Internet) via a network adapter. The network adapter can communicate with other components of data monitor via bus 130. It should be understood that although not shown, other hardware and/or software components could be used in conjunction with MDVR 104. Examples, include, but are not limited to: microcode, device drivers, redundant processing units, external disk drive arrays, RAID systems, tape drives, and data archival storage systems, and the like.

FIG. 1 is intended to provide a brief, general description of an illustrative and/or suitable exemplary environment in which embodiments of the above described embodiments may be implemented. FIG. 1 is exemplary of a suitable environment and is not intended to suggest any limitation as to the structure, scope of use, or functionality of an embodiment of the present disclosure. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

The methods and systems of the present disclosure, as described above and shown in the drawings, provide for cataloguing of audio-visual data with superior properties including ability to more easily store, search and sort recorded audio-visual data. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A method for cataloguing audio-visual data comprising:
   indexing a plurality of audio-visual segments by specifying a storage location and recording time of each segment; and
   creating a segment hierarchy based on the locations and times of each recording.

2. The method of claim 1, further comprising recording the plurality of audio-visual segments with a mobile digital video recorder onto a removable medium located within a vehicle, wherein the mobile digital video recorder identifies the vehicle in which the removable medium is located while recording each segment.

3. The method of claim 2, further comprising creating the segment hierarchy while recording the plurality of audio-visual segments.

4. The method of claim 2, further comprising creating the segment hierarchy after a series of plurality of audio-visual segments are recorded on the removable medium.

5. The method of claim 1, further comprising storing the segment hierarchy onto a central database.

6. The method of claim 5, further comprising placing the removable medium into a desired docking station prior to storing each segment.

7. The method of claim 6, further comprising searching the segment hierarchy based on location and time of each recording.

8. The method of claim 6, wherein the location of each recording is based on identification of the vehicle in which the removable medium was located in while recording each segment.

9. The method of claim 6, further comprising sorting the segment hierarchy based any one of the location, time, and vehicle.

10. The method of claim 5, further comprising accessing the segment hierarchy from a remote location operatively connected to the central database.

11. The method of claim 10, further comprising searching the segment hierarchy based on location and time of each recording.

12. The method of claim 10, wherein the location of each recording is based on identification of the vehicle in which the removable medium was located in while recording each segment.

13. The method of claim 10, further comprising sorting the segment hierarchy based any one of the location, time, and vehicle.

14. The method of claim 1, further comprising displaying the segment hierarchy as a tree view of the recordings being indexed.

15. An audio-visual cataloguing system comprising:
    a vehicle;
    a removable medium electrically connected to the mobile digital video recorder; and
    a mobile digital video recorder positioned within the vehicle, the mobile digital video recorder containing a processor operatively connected to a memory, wherein the memory includes instructions recorded thereon that, when read by the processor, cause the processor to:
       index a plurality of audio-visual segments onto removable medium by specifying a storage location and recording time of each segment; and
       create a segment hierarchy on removable medium based on the locations and times of each recording.

16. The system of claim 15, further comprising recording the series of audio-visual segments with a mobile digital video recorder onto a removable medium located within a vehicle, wherein the vehicle in which the removable medium is located while recording each segment is identified.

17. The system of claim 15, further comprising storing the segment hierarchy onto a central database.

18. The system of claim 15, further comprising placing the removable medium into a desired docking station prior to storing each segment.

19. The system of claim 15, further comprising accessing the segment hierarchy from a remote location operatively connected to the central database.

20. The system of claim 15, further comprising displaying the segment hierarchy as a tree view of the recordings being indexed.

* * * * *